(12) United States Patent
Drofenik et al.

(10) Patent No.: US 12,149,178 B2
(45) Date of Patent: Nov. 19, 2024

(54) CURRENT BALANCING IN POWER SEMICONDUCTORS OF A DC/DC CONVERTER

(71) Applicant: ABB Schweiz AG, Baden (CH)

(72) Inventors: Uwe Drofenik, Zürich (CH); Thomas Bernhard Gradinger, Aarau Rohr (CH); Francisco Canales, Baden-Dättwil (CH)

(73) Assignee: ABB SCHWEIZ AG, Baden (CH)

( * ) Notice: Subject to any disclaimer, the term of this patent is extended or adjusted under 35 U.S.C. 154(b) by 267 days.

(21) Appl. No.: 17/753,961

(22) PCT Filed: Sep. 18, 2020

(86) PCT No.: PCT/EP2020/076147
§ 371 (c)(1),
(2) Date: Mar. 18, 2022

(87) PCT Pub. No.: WO2021/053166
PCT Pub. Date: Mar. 25, 2021

(65) Prior Publication Data
US 2022/0345045 A1 Oct. 27, 2022

(30) Foreign Application Priority Data
Sep. 20, 2019 (EP) .................................... 19198713

(51) Int. Cl.
*H02M 3/335* (2006.01)
*H02M 1/00* (2006.01)
(Continued)

(52) U.S. Cl.
CPC ..... *H02M 3/33523* (2013.01); *H02M 1/0058* (2021.05); *H02M 3/01* (2021.05);
(Continued)

(58) Field of Classification Search
CPC ............... H02M 3/01; H02M 3/33523; H02M 3/33571; H02M 3/33573; H02M 7/4815; H02M 7/493; H02M 1/0058
(Continued)

(56) References Cited

U.S. PATENT DOCUMENTS 10,283,261 B2 5/2019 Jin et al.
2012/0262953 A1\* 10/2012 Jungreis ................ H02M 3/285
363/21.02

(Continued)

FOREIGN PATENT DOCUMENTS

| EP | 2299580 A2 | 3/2011 | |
|---|---|---|---|
| WO | 2014070998 A1 | 5/2014 | |
| WO | WO-2018095797 A1 \* | 5/2018 | ............ H02M 3/285 |

OTHER PUBLICATIONS

Extended European Search Report, issued by the European Patent Office, regarding corresponding patent application Serial No. 19198713. 0; dated Mar. 9, 2020; 9 pages.

(Continued)

*Primary Examiner* — Yemane Mehari
(74) *Attorney, Agent, or Firm* — Greenberg Traurig, LLP

(57) ABSTRACT

A DC/DC converter which includes a first DC link, the first DC link can be a first DC link capacitor; a first plurality of N>1 converter bridges connected in parallel to the first DC link; and a transformer, the transformer can be a medium frequency transformer. The transformer includes a primary side and a secondary side, the primary side including at least one primary winding. The converter further includes a first plurality of N impedance elements, for each converter bridge, a respective impedance element of the first plurality of impedance elements is connected between the converter bridge and the at least one primary winding.

19 Claims, 8 Drawing Sheets

(51) Int. Cl.
*H02M 3/00* (2006.01)
*H02M 7/48* (2007.01)
*H02M 7/493* (2007.01)

(52) U.S. Cl.
CPC ... *H02M 3/33571* (2021.05); *H02M 3/33573* (2021.05); *H02M 7/4815* (2021.05); *H02M 7/493* (2013.01)

(58) Field of Classification Search
USPC .......................................................... 363/17
See application file for complete search history.

(56) References Cited

U.S. PATENT DOCUMENTS

| | | | |
|---|---|---|---|
| 2017/0070150 A1* | 3/2017 | Kim | H02M 3/285 |
| 2017/0110969 A1* | 4/2017 | Zhou | H02M 3/33571 |
| 2018/0269796 A1 | 9/2018 | Yamaoka et al. | |

OTHER PUBLICATIONS

Figge H. et al.; "Paralleling of LLC Resonant Converters Using Frequency Controlled Current Balancing", University of Paderborn, Power Electronics and Electric Drives; DELTA Energy Systems GmbH, Germany; 2008; pp. 1080-1085.
International Search Report and Written Opinion; issued by the ISA/European Patent Office, regarding corresponding patent application Serial No. PCT/EP2020/076147; dated Nov. 6, 2020; 16 pages.

\* cited by examiner

CURRENT BALANCING IN POWER SEMICONDUCTORS OF A DC/DC CONVERTER

CROSS-REFERENCE TO RELATED APPLICATIONS

This is a national stage application which claims priority to International patent application Serial No.: PCT/EP2020/076147, filed on Sep. 18, 2020; which claims priority to European patent application Serial No.: 19198713.0, filed on Sep. 20, 2019; and which are herein incorporated by reference in their entirety.

FIELD OF THE INVENTION

The invention pertains to the field of power electronics. It relates to a DC/DC converter in accordance with the preamble of the independent patent claim.

BACKGROUND OF THE INVENTION

In distributed energy applications like electric vehicle (EV) fast charging, photovoltaic (PV) solar, battery energy storage systems (BESS), wind (onshore or offshore), or datacenter, there is the requirement for electric converter like inverters or rectifiers to provide galvanic insulation and to handle large currents, in particular currents above 100 A, or more specifically, above 200 A or even 500 A. A large number of semiconductor switches has to be put in parallel to provide power switches that can conduct and switch, in particular interrupt a required or desired current without unnecessary and/or extensive losses, as required in particular to build or employ solid state transformers (SSTs). Homogeneous distribution of losses—and thus individual currents—in the parallel chips is difficult to achieve due to parasitics, and inhomogeneous temperatures, geometries and semiconductor properties. This is a challenge especially for future high-current applications of wide bandgap semiconductors due to fast switching speeds, in particular at (switching) frequencies above 1 kHz, or more specifically above 5 kHz or even 10 kHz, and generally relatively small chip size.

While putting a large number of semiconductor switches in parallel theoretically allows for handling, in particular switching and/or conducting the desired and/or required large current, this requires an at least essentially homogeneous distribution of losses in the parallel chips for currents through the individual chips to be at least essentially perfectly balanced. Such an at least essentially homogeneous distribution is difficult to achieve due to parasitics, inhomogeneous temperatures, geometries and/or (individual) semiconductor properties, or rather (statistic) variation of such properties between individual semiconductor chips contained by the semiconductor switches, e.g. due to (non-zero) manufacturing tolerances. A relatively high effort, including e.g. pre-selection of semiconductor switches, chips and/or power modules, selection/development of specific module layouts, selection/development of dedicated gate driver technology, is required to balance the currents sufficiently well. Even then, balancing becomes increasingly difficult with an increasing number of chips, which may e.g. be as low as 10, 5 or even 2, and becomes a challenge especially for future high-current applications of wide bandgap semiconductors.

"Paralleling of LLC resonant converters using frequency controlled current balancing" by Figge et al (Power Electronics Specialist Conference 2008, IEEE) describes a LLC resonant converter drawn as a half-bridge topology (FIG. 1) for use in a switchmode power supply (FIG. 8). Each LLC resonant converter includes a transformer, a pair of switches S1, S2 attached to a DC link, and a resonance inductor Ls joined between the output of the half-bridge and the primary winding of each transformer. The difference between the currents measured at the output of each LLC are input into a balanced load controller, and the switching frequencies of each LLC are adjusted to minimise said difference.

Similarly, U.S. patent application publication no. US 2012/262953 A1 describes a multi-phase resonant converter having a two-converter arrangement (FIG. 7) or a three-converter arrangement (FIG. 9). Each converter of the multi-phase resonant converter includes a transformer TX1A, a half-bridge Q1, Q2 and a resonance inductor L1 connected between the input side of the half-bridge and the primary winding of each transformer.

It is an object of the invention to allow for efficient parallel connection of semiconductor switches, in particular semiconductor switches which are readily available on the market in large numbers a short notice, in DC-to-DC converters.

This object is achieved by a method in accordance with the independent patent claim.

SUMMARY OF THE INVENTION

This object is achieved by a DC/DC converter with a feature combination according to independent patent claim. Further exemplary embodiments are evident from the dependent claims and the following description in combination with the accompanying drawings.

A DC/DC converter in accordance with the invention comprises a first DC link, preferably a first DC link capacitor; a first plurality of $N>1$ converter bridges connected in parallel to the first DC link; and a transformer, preferably a medium frequency transformer, having a primary side and a secondary side; wherein the primary side comprising at least one primary winding. In accordance with the invention, the converter further comprises a first plurality of N impedance elements, wherein for each converter bridge, a different one from the first plurality of impedance elements is connected between said converter bridge and the at least one primary winding.

The DC/DC converter may in particular be a resonant DC/DC converter. Alternatively, it may be a dual active bridge DC/DC converter.

The first plurality of $N>1$ converter bridges may be regarded as part of a DC/AC converter or inverter having an input connected to the first DC link, which may in turn be connected to a grid via a converter, or to a DC electric power source like a PV solar system or a BESS, wherein the DC/AC converter is configured to provide an AC voltage and/or current at an output of said DC/AC converter.

The transformer may be regarded as part of an AC intermediate circuit having an input and/or primary side connected to the output of said DC/AC converter. The AC intermediate circuit may include additional elements, in particular capacitors or inductors connected in parallel with the input or an output or secondary side of the AC intermediate circuit, or in series between input or output of the AC intermediate circuit and the transformer. The transformer may, in particular, be provided with a single primary and/or a single secondary winding only, but will in general comprise a plurality of primary windings and/or a plurality of secondary windings.

The output and/or secondary side of the AC intermediate circuit may be connected to an input of an AC/DC converter configured to convert an AC current and or voltage output by the AC intermediate circuit to a DC voltage and/or an (intermittent) DC current at an output of the AC/DC converter, which may in turn be connected to a second DC link, preferably a second DC link capacitor, at which a load may be connected. If the converter is adapted for bi-directional operation, in particular allowing for bi-directional electric power flow, the load may at least temporarily also act as a generating source.

The first DC link may provide at least two voltage levels, in particular a zero or neutral level and a positive level. The first DC link may also, in particular, provide a positive level, a zero or neutral level, and a negative voltage level.

The converter bridges may in particular be active bridges of arbitrary topology that can apply at least either one of two voltage levels as provided by the first DC link to the input, in particular to input terminals, of the AC intermediate circuit. This may include half-bridges, full bridges, star-point clamped bridges and any kind of multi-stage topologies. For example, a three-point bridge allows the application of a positive voltage, a negative voltage and a zero voltage to the input of the AC intermediate circuit.

Thus, the converter bridges may comprise a plurality of switches and corresponding switched connections, which allow to establish and interrupt connections between the input of the AC intermediate circuit and each of the voltage levels. The switches may, in particular, operate under control, by a controller or a control system, which may be internal to the DC/AC converter, or may be provided externally. Control may be either open-loop control, in particular for a resonant DC/DC converter, or closed-loop, in particular for a dual active bridge DC/DC converter. The controller or control system may preferably be configured to allow or provide for zero current switching (ZCS) or zero voltage switching (ZVS) to minimize switching losses.

Preferably, all of the converter bridges connected in parallel to the first DC link have identical topology. Preferably, corresponding switches of all the converter bridges are configured to operate in an at least essentially synchronized manner. In particular, the controller or control system, may switch all corresponding switches on at least essentially simultaneously, and may switch all corresponding switches off at least essentially simultaneously.

The switches may, in particular, be semiconductor switches including transistors, in particular BJTs (bipolar junction transistors), MOSFETs (metal oxide semiconductor field-effect transistors), IGBTs (integrated gate bipolar transistors); or thyristors, in particular GTOs (gate turn-off thyristors), GCTs (gate commutated thyristors), or IGCTs (integrated gate commutated thyristors).

The aspects as described above as well as further aspects of the invention will become apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical reference symbols in the figures denote identical features or elements.

DETAILED DESCRIPTION OF EXEMPLARY EMBODIMENTS

Figure 1:
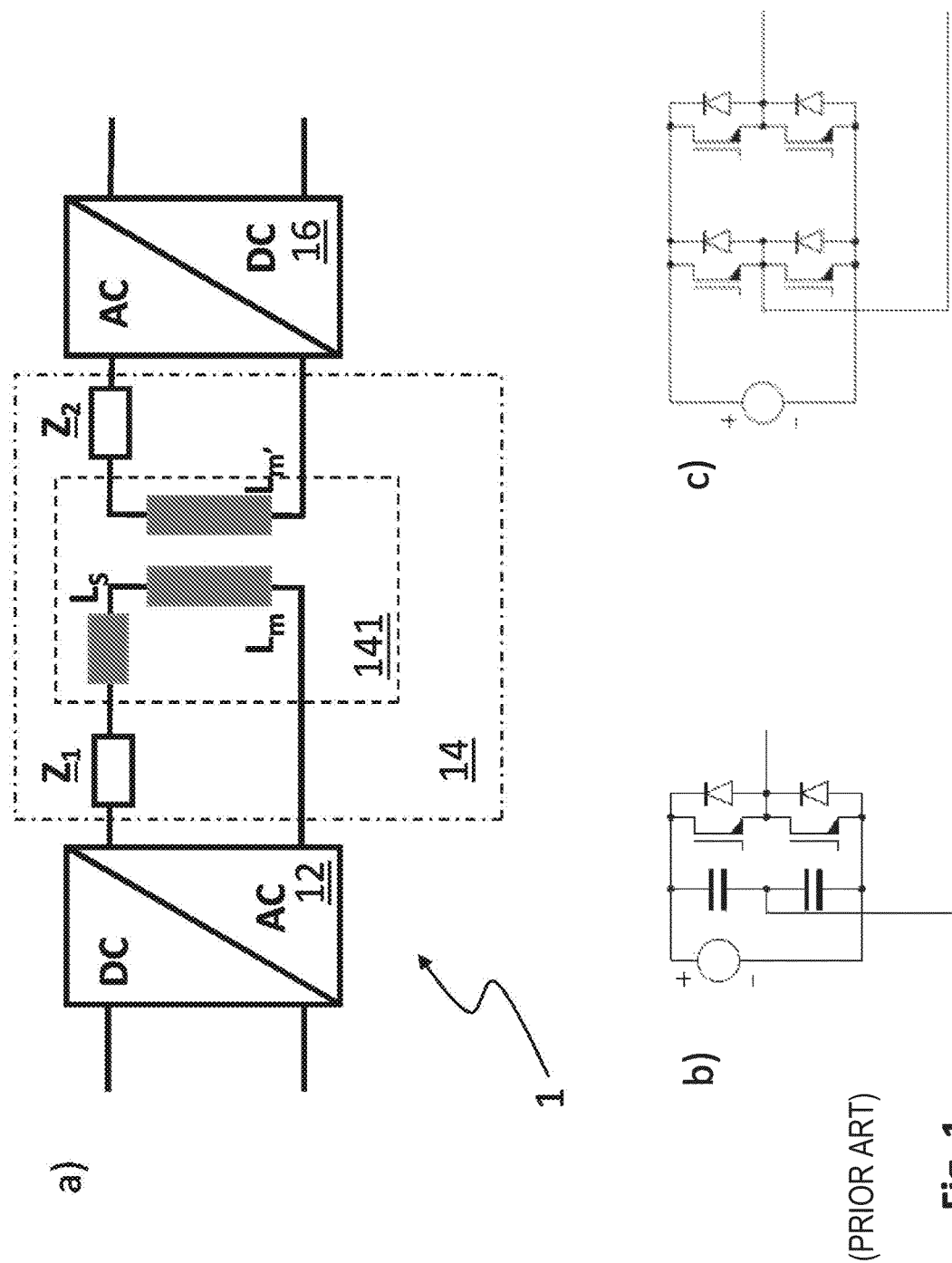
FIG. 1 illustrates a basic, generic, prior art DC/DC converter.

FIG. 1a) illustrates a basic, generic, prior art DC/DC converter 1 which may be considered as one potential starting point for the present invention. A DC/AC converter 12 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14 comprising a transformer 141, in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via an inductance element having an impedance $\underline{Z}_1$, which may also be a parasitic inductance, in particular of a wire or other connection. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration as shown in FIG. 1b), or arranged in a full-bridge configuration as shown in FIG. 1c). Likewise, AC/DC converter 16 may, in particular, comprise a plurality of semiconductor switches arranged in a half-bridge configuration corresponding to the one shown in FIG. 1b), or arranged in a full-bridge configuration corresponding to the one shown in FIG. 1c).

Figure 2:
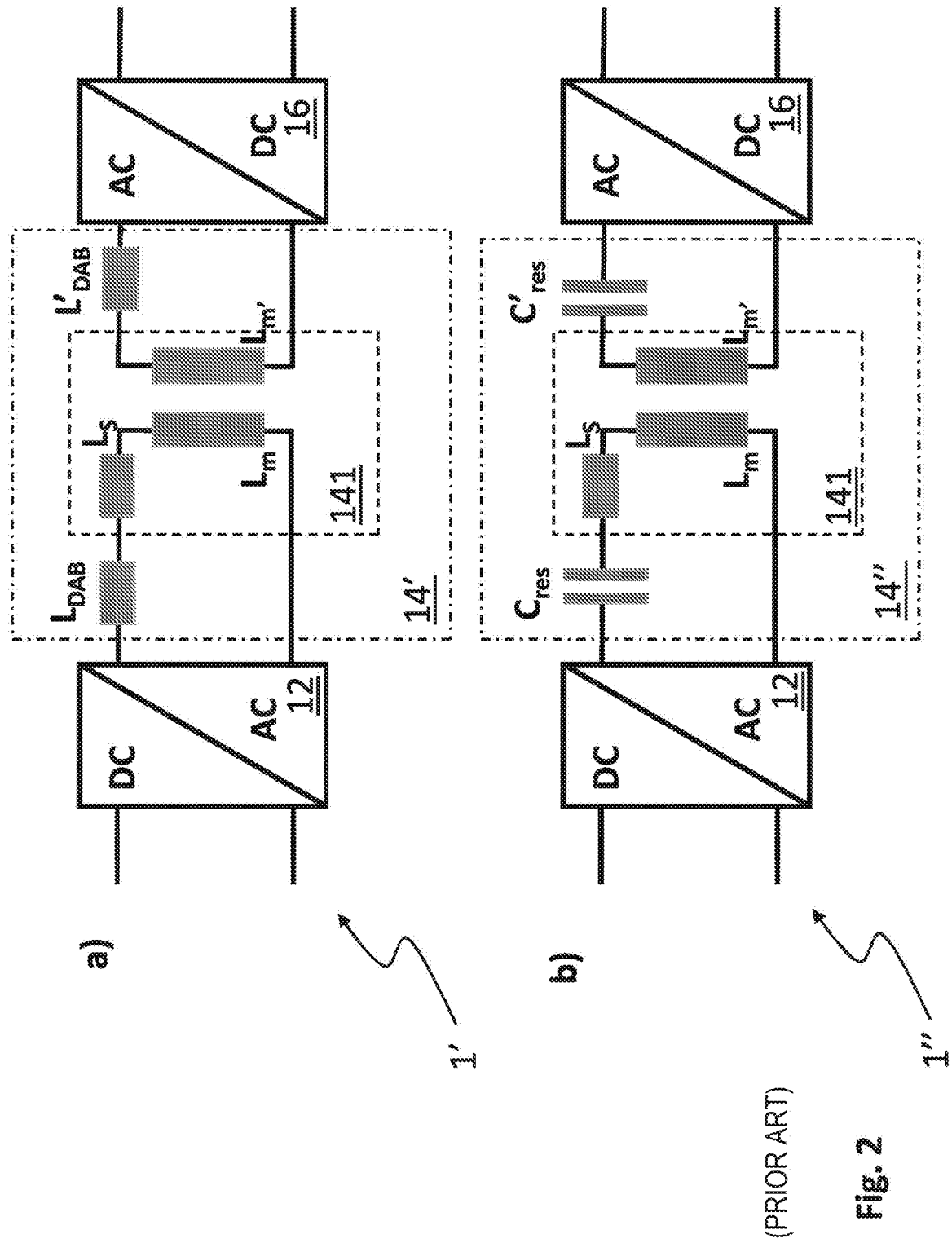
FIG. 2a) illustrates a basic, prior art DC/DC dual active bridge (DAB) converter.
FIG. 2b) illustrates a basic, prior art resonant DC/DC converter.

FIG. 2a) illustrates a basic, prior art DC/DC dual active bridge (DAB) converter 1' which may be considered as an embodiment of the DC/DC converter 1 shown in FIG. 1a), and as another potential starting point for the present invention. DC/AC converter 12 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14' comprising a transformer 141, in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via an inductor as impedance element, with said inductor, sometimes referred to as an energy transfer inductor, having an inductance $L_{DAB}$. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 14. An optional inductor connected between the secondary side of the transformer and the AD/DC converter preferably has an inductance $L'_{DAB}$ which preferably is at least essentially identical to $L_{DAB}$. DC/AC converter 12 may, in particular, comprise a plurality of semiconductor switches arranged in a half-bridge configuration corresponding to the one shown in FIG. 1b), or arranged in a full-bridge configuration corresponding to the one shown in FIG. 1c). Likewise, AC/DC converter 16 may, in particular, comprise a plurality of semiconductor switches arranged in a half-bridge configuration corresponding to the one shown in FIG. 1b), or arranged in a full-bridge configuration corresponding to the one shown in FIG. 1c). Dual active bridge converters are also exemplary described in Swiss patent application publication CH 707 533 A2 or U.S. patent application publication U.S. 2018/0159435 A1, both of which are hereby included by reference in their entirety.

FIG. 2b) illustrates a basic, prior art resonant DC/DC converter 1" which may be considered as another embodiment of the DC/DC converter 1 shown in FIG. 1a), and as yet another potential starting point for the present invention. DC/AC converter 12 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14" comprising a transformer, in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via capacitor as impedance element, with said capacitor having a capacitance $C_{res}$. The capacitor together with the stray inductance is part of a resonant tank comprised by the AC intermediate circuit, which may store electric energy, and which is characterized by a resonance frequency, which in turn depends on the values of $L_s$ and $C_{res}$. The capacitor is therefore commonly referred to as a resonant capacitor. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration corresponding to the one shown in FIG. 1b), or arranged in a full-bridge configuration corresponding to the one shown in FIG. 1c). Likewise, AC/DC converter 16 may, in particular, comprise a plurality of semiconductor switches arranged in a half-bridge configuration corresponding to the one shown in FIG. 1b), or arranged in a full-bridge configuration corresponding to the one shown in FIG. 1c). As an alternative to the variant comprising active bridges as described above and allowing for bi-directional electric power flow, AC/DC converter 16 may, in particular, be embodied without semiconductor switches and comprise diodes only arranged in a half-bridge or full-bridge configuration, in particular free of transistors and thyristors, if only unidirectional electric power flow is required. Resonant DC/DC converters are exemplary described in PCT patent application WO 2018/141092 A1, which is hereby included by reference in their entirety.

Figure 3:
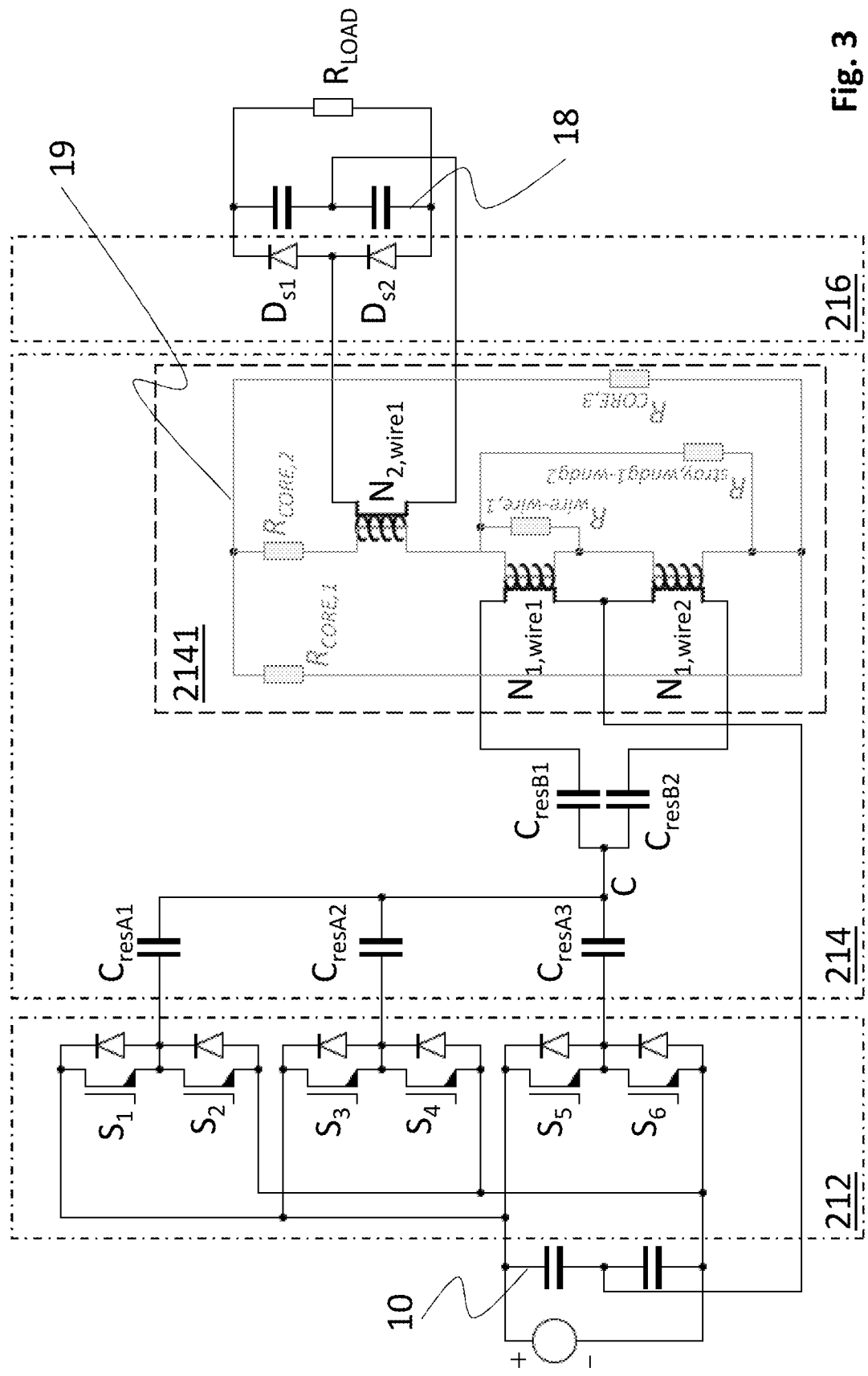
FIG. 3 shows a schematic of an exemplary resonant DC/DC converter in accordance with an embodiment of the invention.

FIG. 3 shows a schematic of an exemplary resonant DC/DC converter in accordance with an embodiment of the invention. The converter comprises a first DC link 10, a DC/AC converter 212 comprising a plurality of semiconductor switches $S_1$, $S_2$, $S_3$, . . . , $S_6$, an AC intermediate circuit 214, an AC/DC converter 216, and a second DC link 18. The converter comprises a plurality of active half bridges which are connected to a single, first DC link 10, while each of their outputs is connected via an individual one of a first plurality (N=3) of capacitors $C_{resA}$ and a common node C to a primary coil of a medium frequency transformer 2141, said transformer providing, inter alia, for galvanic insulation between a primary and a secondary side of said transformer. The primary coil comprises a plurality of M=2 parallel windings, $N_{1,\ wire\ 1}$ and $N_{1,\ wire\ 2}$, i.e. windings electrically connected in parallel, with each winding formed by a wire, and wherein each wire or winding is connected to common node C via an individual one of a second plurality (M=2) of capacitors $C_{resB}$. Providing common node C as a single point of coupling, where capacitors $C_{resA}$ and capacitors $C_{resB}$ are all connected, allows to optimize semiconductor switches and transformer wires independently. Preferably, capacitances of all capacitors of the first plurality of capacitors $C_{resA}$ are identical to one another. Similarly, capacitances of all capacitors of the second plurality of capacitors $C_{resB}$ are also identical to one another, but not necessarily to the capacitances of the first plurality of capacitors $C_{resA}$. Also shown, merely for background information, is a voltage source connected to the first DC link 10, a resistive load connected to the second DC link 18 and a reluctance network 19 indicative of a core and stray flux of the transformer.

Figure 4:
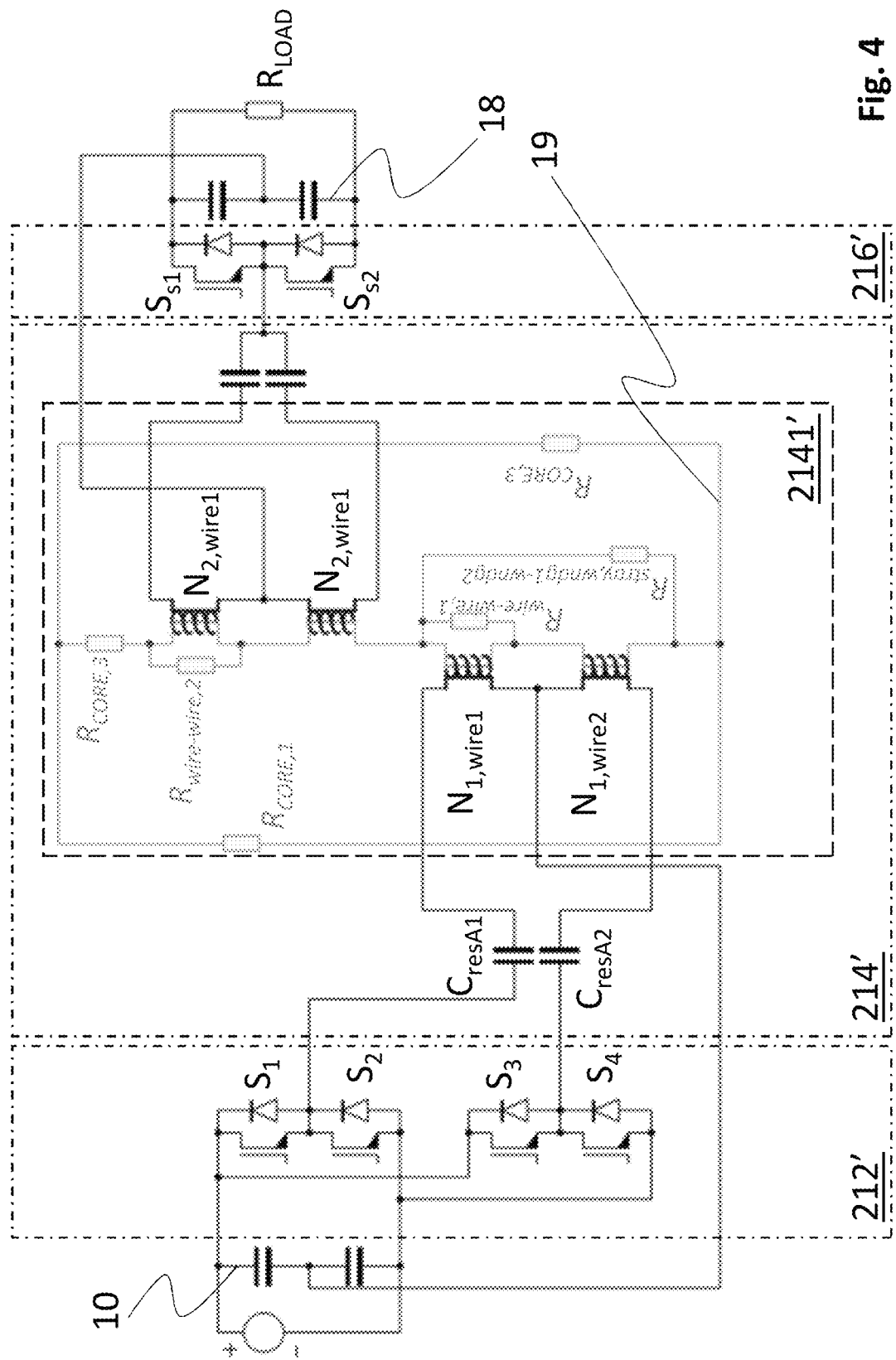
FIG. 4 shows a schematic of an exemplary resonant DC/DC converter in accordance with another embodiment of the invention.

FIG. 4 shows a schematic of an exemplary resonant DC/DC converter in accordance with another embodiment of the invention. The converter comprises a first DC link 10, a DC/AC converter 212', an AC intermediate circuit 214', an AC/DC converter 216', and a second DC link 18. The DC/AC converter 212' of the resonant DC/DC converter comprises a plurality of N active half bridges, where N is an integer multiple of a number M of paralleled primary windings of the transformer, or vice versa, for the exemplary choice of N=M=2. As may be seen, the capacitors $C_{resA}$ are not connected to each other at their transformer sides, but are each directly connected to a transformer winding without the presence of a common node as in the previous embodiment.

Figure 5:
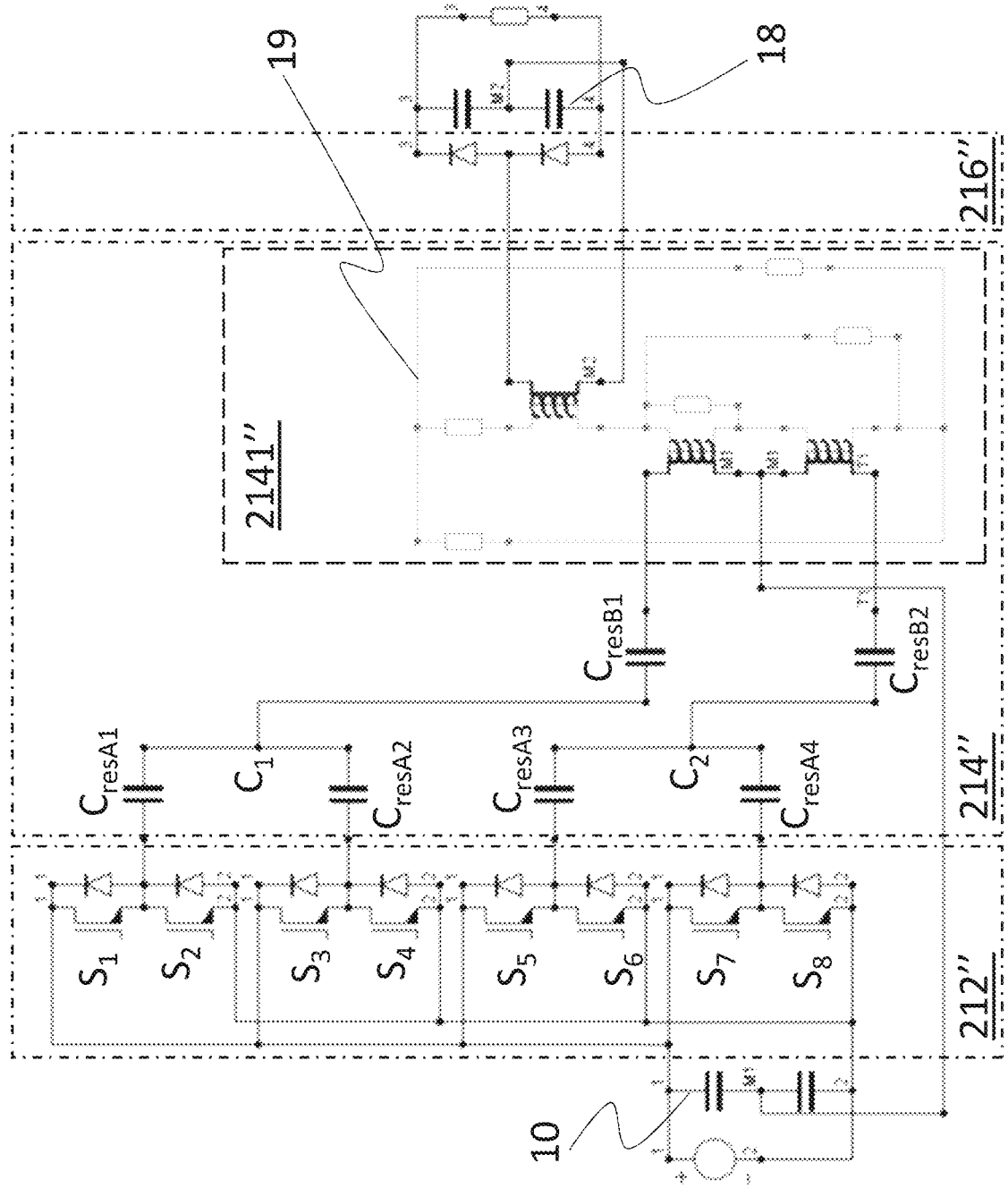
FIG. 5 shows a schematic of yet another exemplary resonant DC/DC converter in accordance with yet another embodiment of the invention.

FIG. 5 shows a schematic of yet another exemplary resonant DC/DC converter in accordance with yet another embodiment of the invention. The converter comprises first DC link 10, a DC/AC converter 212" comprising a plurality of semiconductor switches $S_1$, $S_2$, $S_3$, . . . , $S_8$, an AC intermediate circuit 214", an AC/DC converter 216", and second DC link 18. The DC/AC converter 212" of the resonant DC/DC converter comprises a plurality of N=4 active half bridges, outputs of which are connected to together in pairs via capacitors $C_{resA1}$ and $C_{resA2}$ at a first common node $C_1$ and via capacitors $C_{resA3}$ and $C_{resA4}$ at a second common node $C_2$. Each of said plurality of O=2 common nodes $C_1$ and $C_2$ is directly connected to a different one of M=2 primary windings, in particular without the presence of a further common node in between.

In the embodiments as shown in FIGS. 3, 4 and 5, the capacitors $Cr_{esA1}$, $C_{resA2}$, . . . and—if present—$C_{resB1}$, $C_{resB2}$ replace the resonant capacitor $C_{res1}$ of FIG. 2b), and jointly act as resonant capacitor of the AC intermediate circuits 214 and 214'. Said capacitors $C_{resA}$ and—if present—$C_{resB}$ may thus be regarded as a split resonant capacitors, with each individual one of said capacitors acting as a partial resonant capacitor. Due to the presence of these partial resonant capacitors, current through each active half bridge or bridge leg is no longer defined by power module parasitics, inhomogeneous temperature distributions and/or semiconductor switch characteristics (which are not perfectly equal for all chips), but by the resonant tank which is defined by the transformer stray flux (approximately equal for all parallel wires) and the split resonant capacitors (which have, in a defined range, a limited maximum deviation from a referenced capacitance, e.g. 5%). This makes a current distribution homogenous and stable without requiring additional measures or effort.

Furthermore, connecting the parallel half bridges via split resonant capacitors provided also between common node C and the plurality of M=2 parallel windings prevents circulating currents in the transformer winding which would otherwise create huge losses in MFTs and/or significantly reduce the converter's performance.

Generation of circulating currents, in particular in a configuration of two windings connected in parallel without impedance elements in between, and with each winding comprising a plurality of turns, may be understood as follows: Each of the turns is exposed to a magnetic stray field, e.g. in a windings window formed by a core of the transformer. Parallel litz wires forming individual windings which are connected at input and output terminals of the transformer form a loop which is exposed to the magnetic stray field. The magnetic stray field changes with the MFT's operating frequency, resulting in a voltage which drives a circular current in this loop. The circulating current adds to a nominal current in the MFT which may result in one litz wire carrying more than half of the nominal current, and the parallel one carrying accordingly less than half of the nominal current. If the circulating current is large enough, one litz wire can carry more than a total nominal current, and then the parallel one carries a negative (180° phase-shifted) current. In this way, not only is a total available copper cross section effectively reduced by 50%, but additional losses are introduced, and a maximum output power of the MFT is reduced by a factor two or more.

Figure 6:
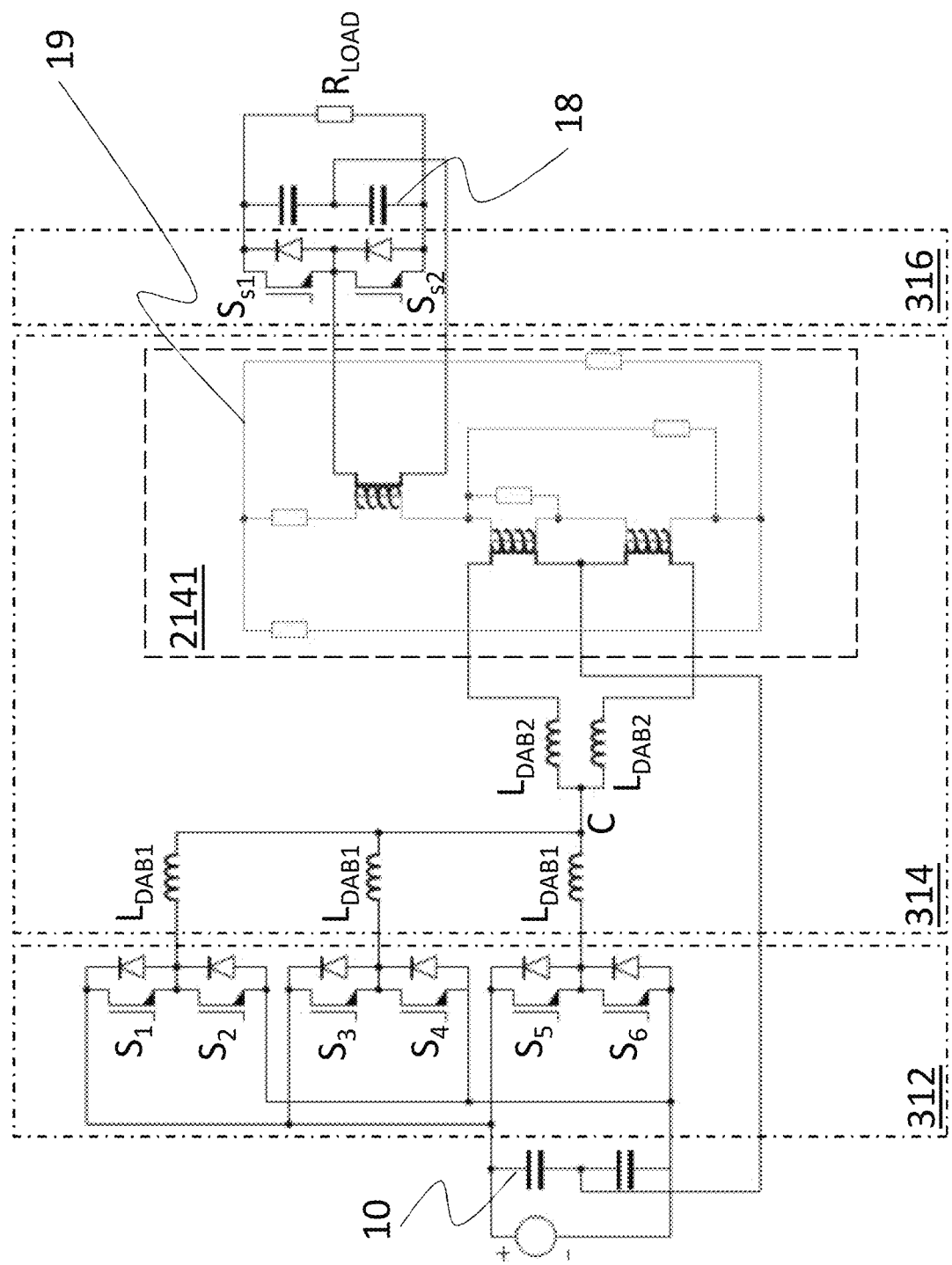
FIG. 6 shows a schematic of a dual active bridge DC/DC converter in accordance with an embodiment of the invention.

FIG. 6 shows a schematic of a dual active bridge DC/DC converter in accordance with an embodiment of the invention. The converter comprises a first DC link 10, a DC/AC converter 312 comprising a plurality of semiconductor switches $S_1$, $S_2$, $S_3$, . . . , $S_6$, an AC intermediate circuit 314, an AC/DC converter 316, and a second DC link 18. The converter comprises a plurality of active half bridges which are connected to single, first DC link 10, while each of their outputs is connected via an individual one of a first plurality (N=3) of inductors $L_{DAB1}$ and common node C to a primary coil of a medium frequency transformer 2141, said transformer providing, inter alia, for galvanic insulation between primary and secondary side of said transformer. The primary coil comprises a plurality of M=2 parallel windings, i.e. windings electrically connected in parallel, with each winding formed by a transformer wire, and wherein each wire or winding is connected to common node C via an individual one of a second plurality (M=2) of inductors $L_{DAB2}$. Providing common node C as a single point of coupling, where inductors $L_{DAB1}$ and inductors $L_{DAB2}$ are all connected, allows to optimize semiconductor switches and transformer wires independently. Preferably, inductances of all inductors of the first plurality of inductors $L_{DAB1}$ are all identical to one another. Similarly, inductances of all inductors of the second plurality of inductors $L_{DAB2}$ are also identical to one another, but not necessarily to the inductances of the first plurality of inductors $L_{DAB1}$. Also shown, merely for background information, is a voltage source connected to the first DC link 10, a resistive load connected to the second DC link 18 and characterized by a resistance $R_{load}$, and (in gray) a network 19 of parasitic resistances of the transformer.

Figure 7:
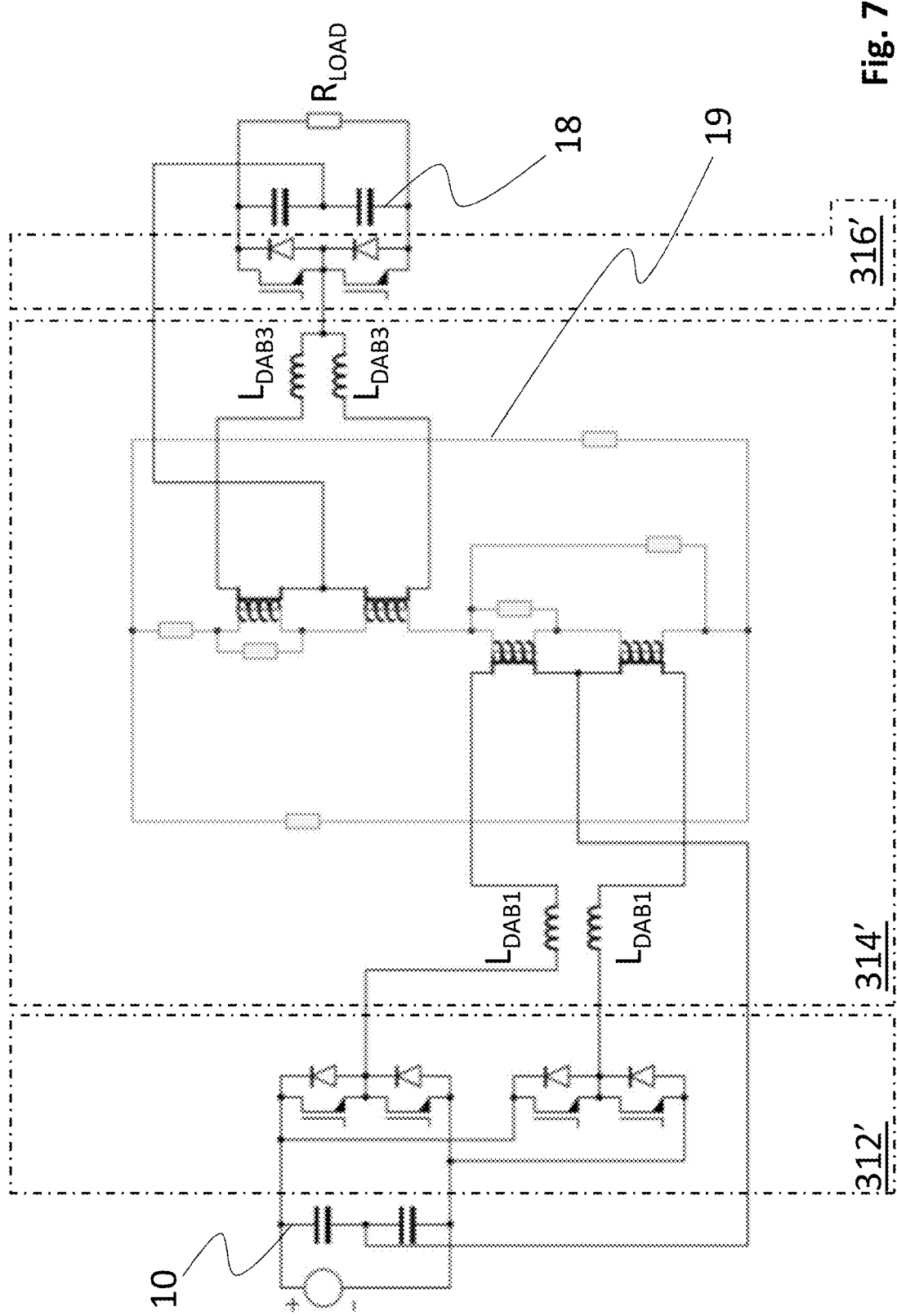
FIG. 7 shows a schematic of an exemplary dual active bridge DC/DC converter in accordance with another embodiment of the invention.

FIG. 7 shows a schematic of an exemplary dual active bridge DC/DC converter in accordance with another embodiment of the invention. The converter comprises a first DC link 10, a DC/AC converter 312', an AC intermediate circuit 314', an AC/DC converter 316', and a second DC link 18. The DC/AC converter 312' of the dual active bridge DC/DC converter comprises a plurality of N active half bridges, where N is an integer multiple of a number M of paralleled primary windings of the transformer, or vice versa, for the exemplary choice of N=M=2. As may be seen, the inductors $L_{DAB1}$ are not connected to each other at their transformer sides, but are each directly connected to a transformer winding without the presence of a common node as in the previous embodiment.

In the embodiments as shown in FIGS. 6 and 7, the inductors $L_{DAB1}$ and—if present—$L_{DAB2}$ replace the energy transfer inductor $L_{DAB1}$ of FIG. 2a), and jointly act as energy transfer inductor of the intermediate circuits 314 and 314'. Said inductors may thus be regarded as a split resonant inductors, with each individual one of said capacitors acting as a partial energy transfer inductor. Due to the presence of these partial energy transfer inductors, current through each active half bridge or bridge leg is no longer defined by power module parasitics, inhomogeneous temperature distributions and/or semiconductor characteristics (which are not perfectly equal for all chips), but by the split energy transfer inductors (which have, in a defined range, a limited maximum deviation from a referenced inductance, e.g. 5%). This makes a current distribution homogenous and stable without requiring additional measures or effort.

Furthermore, connecting the parallel half bridges via split energy transfer inductors prevents circulating currents in the transformer winding which create huge losses in MFTs and/or significantly reduce the converter's performance.

Figure 8:
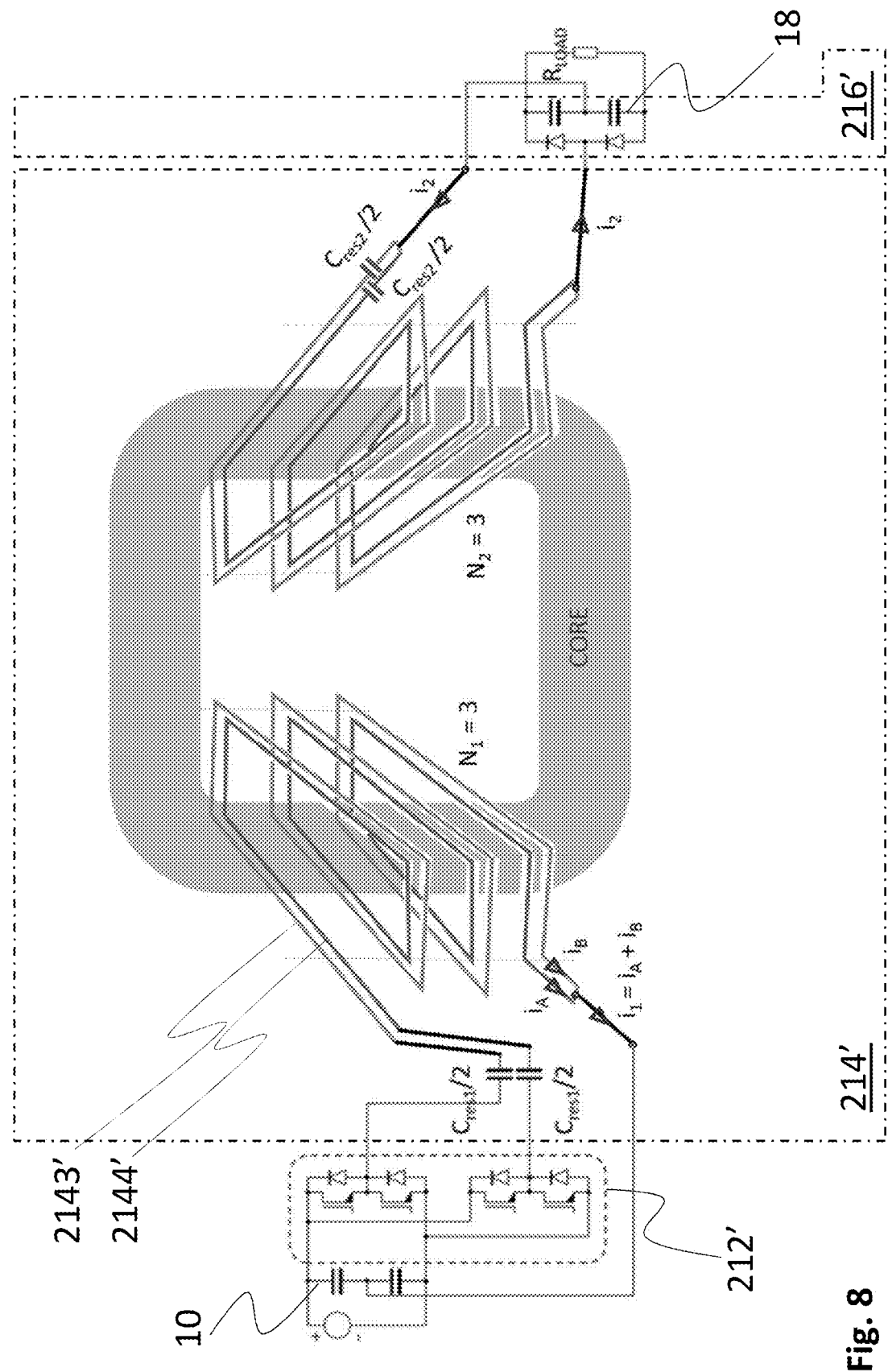
FIG. 8 illustrates an exemplary, physical winding configuration of a DC/DC converter in accordance with the present invention.

FIG. 8 illustrates an exemplary, physical winding configuration of a DC/DC converter in accordance with the present invention, on the basis of the embodiment from FIG. 4. As may be seen, a spatial relation of the parallel wires 2143' and 2144' remains unchanged along and over the entire winding, i.e. no transpositions occur. In the prior art, such transpositions are for example provided by parallel wires twisted around one another or otherwise intertwined or interlaced. However such transpositions require additional manufacturing effort, especially for foil windings, lead to an increased effective wire-length, exhibit limited efficiency in MFTs with only a few winding turns and may lead to high voltage insulation challenges, e.g. due to geometric inhomogeneities in a vicinity of transposition locations.

In all embodiments shown, the secondary side of the DC/DC converter (as shown on the right hand side of FIGS. 3 to 7 may alternatively be embodied in analogy to the primary side of any embodiment of the same DC/DC converter type, i.e. resonant converter or dual active bridge converter.

Advantageous characteristics of the invention are:

No extra components are required. Splitting the resonant capacitor or energy transfer inductor as proposed keeps a total capacitor/inductor size, in particular a total/summed capacitance or inductance, unchanged.

Allows low-cost realization of resonant and dual active bridge DC/DC converter cells, employing and/or enabling off-the-shelf power semiconductor switches for high current applications simply by adding further half bridges.

Allows low-cost realization of resonant converter cells and dual active bridge using wide bandgap semiconductor switches for high current applications, which would otherwise become increasingly difficult due to fast switching speeds and smaller chip size (as compared to non-wide bandgap semiconductor switches).

An MFT with a single output or secondary side terminal internally connecting all parallel windings can be used which is, e.g. in case of windings made from foil, in particular low-cost foil, easier to build while still able to fulfil strict insulation requirements for high voltage applications.

No theoretical limitation of a number (N or N') of parallel converter bridges, i.e. power semiconductor switches.

Simple, robust, no active current balancing control required.

Maximum and/or nominal electric power per MFT may be increased, due to an increase of a maximum current a single MFT can handle. This is key to building economically efficient MFTs. In higher-power (and thus larger) MFTs, an insulation effort, in particular a volume required for sufficient insulation is, in a relative sense, reduced. An alternative way of providing higher power via higher current would be to parallel-connect entire resonant converter or dual active bridge converter cells in an SST, or even to parallel-connect entire SSTs, and thus the number of MFTs required. But this would not increase a power level of the individual MFTs.

Circulating currents in parallel transformer windings which are built from parallel wires are efficiently suppressed due to split resonant capacitors or split energy transfer inductors which block such currents—this also enables employment of more common litz wire of smaller cross-section, which is potentially probably cheaper, and may be manufactured using reduced effort and resources.

Very general concept for resonant and dual active bridge DC/DC converters that have to deal with hundreds of amps; not only cells in MV-grid connected SSTs but also for high-power low-voltage applications, as e.g. required in various EV fast charger topologies.

Preferred embodiments of the present invention, in particular as described above, may be realized as detailed in the embodiments in accordance with the items listed below, advantageously in combination with one or more of the features as detailed above, or in accordance with the claims as presented further below.

A DC/DC converter, comprising
a first DC link 10, preferably comprising a first DC link capacitor;
a first plurality of N>1 converter bridges connected in parallel to the first DC link;
a transformer, preferably a medium frequency transformer, having a primary side and a secondary side;
the primary side comprising at least one primary winding; wherein
the converter further comprises a first plurality of N impedance elements, wherein
for each converter bridge, a different one from the first plurality of impedance elements is connected between said converter bridge and the at least one primary winding.

A DC/DC converter, comprising
a first DC link, preferably comprising a first DC link capacitor;
a DC/AC converter having an input connected to the first DC link and comprising:
a first plurality of N>1 converter bridges connected in parallel to the first DC link;
an AC intermediate circuit having an input connected to an output of the DC/AC converter and comprising
a transformer, preferably a medium frequency transformer, having a primary side and a secondary side;
the primary side comprising at least one primary winding;
an AC/DC converter having an input connected to the secondary side of the AC intermediate circuit,
a second DC link, preferably comprising a second DC link capacitor, connected to an output of the AC/DC converter; wherein
the AC intermediate circuit further comprises a first plurality of N impedance elements, wherein
for each converter bridge, a different one from the first plurality of impedance elements is connected between said converter bridge and the at least one primary winding.

The DC/DC converter in accordance with any of the preceding embodiments, wherein each of the converter bridges is an inverter half-bridge comprising a first input terminal and a second input terminal, an inverter bridge output (alternatively conductively connectable to the first or second input terminal by means of a plurality of semiconductor switches), wherein for each inverter half-bridge, a different one of the first plurality of impedance elements is connected in series with the inverter bridge output.

The DC/DC converter in accordance with any of the preceding embodiments, and with
the primary side of the transformer comprising a plurality of M>1 primary windings, each of the plurality of primary windings having a first and a second terminal;
a second plurality of M impedance elements; and wherein
each of the first plurality of N impedance elements is connected between one of the converter bridges and a common node (C);
each of the second plurality of M impedance elements is connected between the common node and the first terminal of a different one of the plurality of primary windings.

The DC/DC converter in accordance with any of the preceding embodiments, and with
the primary side of the transformer comprising a plurality of M>1 primary windings, each of the plurality of primary windings having a first and a second terminal;

a second plurality of M impedance elements; the DC/DC converter further comprising a plurality O of common nodes with O<N and O<M and wherein each of the first plurality of N impedance elements is connected between one of the converter bridges and one of the common nodes;

each of the second plurality of M impedance elements is connected between one of the common nodes and the first terminal of a different one of the plurality of primary windings.

The DC/DC converter in accordance with any of the preceding embodiments, wherein M≠N, preferably M<N.

The DC/DC converter in accordance with any of the preceding embodiments, and with the primary side of the transformer comprising a plurality of N primary windings, each of the plurality of primary windings having a first and a second terminal; wherein the converter bridges and the primary windings are connected in pairs via a different one from the first plurality of impedance elements connected to the first terminal of the respective one from the plurality of primary windings.

The DC/DC converter in accordance with any of the preceding embodiments, wherein each of the converter bridges is an inverter half-bridge comprising a first input terminal and a second input terminal, an inverter bridge output (alternatively conductively connectable to the first or second input terminal by means of a plurality of semiconductor switches), each impedance element has a first terminal and a second terminal, and wherein for each inverter half-bridge, the first terminal of each of the respective one of the plurality of impedance elements is connected to the respective inverter bridge output, and the second terminals of all impedance elements from the first plurality of N impedance elements are connected together at the common node.

The DC/DC converter in accordance with any of the preceding embodiments, wherein each of the converter bridges is an inverter half-bridge comprising a first input terminal and a second input terminal, an inverter bridge output (alternatively conductively connectable to the first or second input terminal by means of a plurality of semiconductor switches), each impedance element has a first terminal and a second terminal, and wherein for each inverter half-bridge, the first terminal of each of the respective one of the plurality of impedance elements is connected to the respective inverter bridge output, and the second terminal of each of the impedance elements from the first plurality of N impedance elements is connected to a different primary winding.

The DC/DC converter in accordance with any of the preceding embodiments, wherein the second terminals of all of the plurality of primary windings are connected together.

The DC/DC converter in accordance with any of the preceding embodiments, wherein the first DC link has a positive terminal and negative terminal, the first input terminals of all inverter half-bridges are connected to the positive terminal, and the second input terminals of all inverter half-bridges are connected to the negative terminal.

The DC/DC converter in accordance with any of the preceding embodiments, wherein the first DC link further has a neutral terminal and the second terminals of all of the plurality of primary windings are connected to the neutral terminal.

The DC/DC converter in accordance with any of the preceding embodiments, wherein the converter is a resonant converter, and each of the plurality of impedance elements is a capacitor.

The DC/DC converter in accordance with any of the preceding embodiments, wherein the converter is a dual active bridge converter, and each of the plurality of impedance elements is an inductor.

The DC/DC converter in accordance with any of the preceding embodiments, further comprising a second DC link, preferably comprising a second DC link capacitor a second plurality of N'>1 converter bridges connected in parallel to the second DC link;

the secondary side of the transformer comprising at least one secondary winding;

the converter further comprises a third plurality of N' impedance elements, wherein for each converter bridge from the third plurality of N'>1 converter bridges, a different one from the third plurality of impedance elements is connected between said converter bridge and the at least one secondary winding.

The DC/DC converter in accordance with any of the preceding embodiments, wherein each one of the first plurality of N>1 converter bridges is an inverter bridge;

the secondary side of the transformer comprises at least one secondary winding; the converter further comprising:

a second DC link, preferably comprising a second DC link capacitor;

a second plurality of N'>1 rectifier bridges connected in parallel to the second DC link;

a third plurality of N' impedance elements, wherein for each rectifier bridge, a different one from the third plurality of impedance elements is connected between said rectifier bridge and the at least one secondary winding.

The DC/DC converter in accordance with any of the preceding embodiments, with the secondary side of the transformer comprising a plurality of M'>1 secondary windings, each of the plurality of secondary windings having a first and a second terminal;

a fourth plurality of M' impedance elements; and wherein each of the third plurality of N' impedance elements is connected between one of the converter bridges and a further common node;

each of the fourth plurality of M' impedance elements is connected between the further common node and the first terminal of a different one of the plurality of secondary windings.

The DC/DC converter in accordance with any of the preceding embodiments, further comprising a second DC link, preferably comprising a second DC link capacitor a second plurality of N'>1 converter bridges connected in parallel to the second DC link; with the secondary side of the transformer comprising a plurality of N' secondary windings, each of the plurality of secondary windings having a first and a second terminal; wherein the converter bridges and the secondary windings are connected in pairs via a different one from the third plurality of impedance elements connected to the first terminal of the respective one from the plurality of secondary windings.

The DC/DC converter in accordance with any of the preceding embodiments, wherein the converter bridges of the first plurality of N>1 converter bridges are active bridges configured to operate in an at least essentially synchronized manner, and if present, the converter bridges of the second plurality of converter bridges are also active bridges configured to operate in an at least essentially synchronized manner.

Unless specified otherwise, a connection, in particular between any two entities, including in particular nodes, points, terminals, elements, devices, etc. or combinations thereof, refers to an electrically conductive connection, as in particular established by a wire, cable, busbar, a conductive track, trace or line on e.g. a (printed) circuit board, solder, etc. The electrically conductive connection is preferably at least substantially direct, in particular without any discrete elements, as, in particular, resistors, capacitors, inductors, or other passive or active elements or devices connected between the connected entities. The electrically conductive connection thus has at least essentially negligible resistance, capacitance and inductance, preferably at least essentially zero resistance, capacitance and inductance. In particular, resistance, capacitance and inductance of the electrically conductive connection are exclusively parasitic by nature. Further, resistance, capacitance and inductance of the electrically conductive connection significantly smaller (preferably by a factor of $1/100$, $1/1000$ or $1/10000$) than resistances, capacitances and impedances of resistors, capacitors or inductors, respectively, connected by the electrical conductive connection, and/or comprised by an electric circuit or network which comprises the electrically conductive connection.

Unless specified otherwise, an electric connection or electrical connection is identical to connection as defined above.

Unless specified otherwise, if two entities, including in particular nodes, points, terminals, elements, devices, etc. or combinations thereof, are said to be connected, electrically connected or to be (electrically) connected together, a connection as defined above exists between the two entities.

Unless specified otherwise, if a first and a second entity, including in particular a first and second node, point, terminal, element, device, etc. or combinations thereof, are said to be connected via a third entity, including in particular a third node, point, terminal, element, device, or with such a third entity (in) between, a connection as described above exists between the first and third entities as well as between the third and second entities. However, no connection as described above, in particular no at least substantially direct connection exists between the first and second entities. If explicitly specified, the third element may in particular also be a connection, in particular a conductor, wire, cable, busbar etc. In such case, it may be assumed that no connection as described above other than the specified one is present.

Unless stated otherwise, it is assumed that throughout this patent application, a statement $a \approx b$ implies that $|a-b|/(|a|+|b|)<10$, preferably $|a-b|/(|a|+|b|)<100$, wherein a and b may represent arbitrary variables as described and/or defined anywhere in this patent application, or as otherwise known to a person skilled in the art. Further, a statement that a is at least approximately equal or at least approximately identical to b implies that $a \approx b$, preferably $a=b$. Further, unless stated otherwise, it is assumed that throughout this patent application, a statement $a \gg b$ implies that $a>10b$, preferably $a>100b$; and statement $a \ll b$ implies that $10a<b$, preferably $100a<b$.

Unless stated otherwise, N, M, O, N', M', O', are used throughout this patent application to represent integer numbers.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope of the following claims. In particular, the present invention covers further embodiments with any combination of features from different and/or individual embodiments as described above and below. Embodiments in accordance with the invention may, in particular, include further and/or additional features, elements, aspects, etc. not shown in the drawings or described above.

The disclosure also covers all further features shown in the Figures, individually, although they may not have been described in the afore or following description. Also, individual alternatives of the embodiments described in the Figure and the description and individual alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude further or additional features, elements, steps etc., and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute, property or a value particularly also comprise exactly the attribute, property or value, respectively, as stated. The term "approximately" or "about" in the context of a given numerate value or range refers to a value or range that is, e.g., within 20%, within 10%, within 5%, or within 2% of the given value or range, and, in particular, also comprises the exact value or range as stated. Components described as coupled or connected may be electrically or mechanically directly coupled, or they may be indirectly coupled via one or more intermediate components. Any reference signs in the claims shall not be construed as limiting the scope.

The invention claimed is:

1. A DC/DC converter, comprising:
a first DC link;
a first plurality of N>1 converter bridges connected in parallel to the first DC link; and
a transformer, wherein the transformer has a primary side and a secondary side;
wherein the primary side of the transformer comprises a plurality of M>1 primary windings, each of the plurality of M>1 primary windings having a first and a second terminal;
wherein the first plurality of N>1 converter bridges further comprises a first plurality of N impedance elements and a second plurality of M impedance elements,
wherein for each converter bridge, respective impedance element of the first plurality of N impedance elements is connected between the converter bridge and a common node (C), and
wherein each of the second plurality of M impedance elements is connected between the common node and the first terminal of a respective primary winding of the plurality of M>1 primary windings,
wherein N is an integer multiple of a number M of paralleled primary windings of the transformer.

2. The DC/DC converter of claim 1, wherein each converter bridge is an inverter half-bridge comprising a first input terminal and a second input terminal, an inverter bridge output, wherein for each inverter half-bridge, the respective impedance element of the first plurality of N impedance elements is connected in series with the inverter bridge output.

3. The DC/DC converter of claim 1, further comprising:
a plurality O of common nodes with O<N and O<M,
wherein each of the first plurality of N impedance elements is connected between one of the converter bridges and one of the common nodes; and
wherein each of the second plurality of M impedance elements is connected between one of the common nodes and the first terminal of a respective primary winding of the plurality of M>1 primary windings.

4. The DC/DC converter of claim 1, wherein the primary side of the transformer comprising a plurality of N primary windings, each of the plurality of primary windings having a first and a second terminal; wherein the converter bridges and the primary windings are connected in pairs via the respective impedance element of the first plurality of N impedance elements connected to the first terminal of a respective primary winding of the plurality of N primary windings.

5. The DC/DC converter of claim 1, wherein
wherein each converter bridge is an inverter half-bridge comprising a first input terminal and a second input terminal, an inverter bridge output,
wherein each impedance element has a first terminal and a second terminal,
wherein, for each inverter half-bridge, the first terminal of each of the respective impedance element of the first plurality of N impedance elements is connected to the respective inverter bridge output, and
wherein the second terminals of each respective impedance element of the first plurality of N impedance elements are connected together at the common node.

6. The DC/DC converter of claim 4, wherein
the second terminal of each of the impedance elements from the first plurality of N impedance elements is connected to a different primary winding.

7. The DC/DC converter of claim 1, wherein the second terminals of all of the plurality of M>1 primary windings are connected together.

8. The DC/DC converter of claim 1, wherein the converter is a resonant converter, and each of the plurality of N impedance elements is a capacitor.

9. The DC/DC converter of claim 1, wherein the converter is a dual active bridge converter, and each of the plurality of N impedance elements is an inductor.

10. The DC/DC converter of claim 1, further comprising:
a second DC link; and
a second plurality of N'>1 converter bridges connected in parallel to the second DC link;
wherein the secondary side of the transformer comprising at least one secondary winding;
wherein the converter further comprising a third plurality of N' impedance elements, and
wherein, for each converter bridge from the third plurality of N'>1 converter bridges, a respective impedance element from the third plurality of N' impedance elements is connected between said converter bridge and the at least one secondary winding.

11. The DC/DC converter of claim 1, further comprising:
a second DC link;
a second plurality of N'>1 rectifier bridges connected in parallel to the second DC link; and
a third plurality of N' impedance elements,
wherein each one of the first plurality of N>1 converter bridges is an inverter bridge;
wherein the secondary side of the transformer comprises at least one secondary winding;
wherein for each rectifier bridge, the respective impedance element of the third plurality of N' impedance elements is connected between said rectifier bridge and the at least one secondary winding.

12. The DC/DC converter of claim 11, further comprising:
a fourth plurality of M' impedance elements;
wherein the secondary side of the transformer comprises a plurality of M'>1 secondary windings, each of the plurality of M'>1 secondary windings having a first and a second terminal;
wherein each of the third plurality of N' impedance elements is connected between one of the converter bridges and a further common node; and
wherein each of the fourth plurality of M' impedance elements is connected between the further common node and the first terminal of a respective secondary winding of the plurality of M'>1 secondary windings.

13. The DC/DC converter of claim 12, further comprising:
a second DC link;
a second plurality of N'>1 converter bridges connected in parallel to the second DC link;
wherein the secondary side of the transformer comprises a plurality of N' secondary windings, each of the plurality of N' secondary windings having a first and a second terminal; and
wherein the converter bridges and the secondary windings are connected in pairs via the respective impedance element of the third plurality of N' impedance elements connected to the first terminal of the respective one from secondary winding of the plurality of N' secondary windings.

14. The DC/DC converter of claim 1, wherein the converter bridges of the first plurality of N>1 converter bridges are active bridges configured to operate in a synchronized manner.

15. The DC/DC converter of claim 1, wherein the first DC link comprises a first DC link capacitor.

16. The DC/DC converter of claim 1, wherein the transformer is a medium frequency transformer.

17. The DC/DC converter of claim 10, wherein the second DC link comprises a second DC link capacitor.

18. The DC/DC converter of claim 11, wherein the second DC link comprises a second DC link capacitor.

19. The DC/DC converter of claim 13, wherein the second DC link comprises a second DC link capacitor.

\* \* \* \* \*